US 6,701,192 B1

(12) United States Patent
Herwig

(10) Patent No.: US 6,701,192 B1
(45) Date of Patent: Mar. 2, 2004

(54) WIRING HUB FOR A RETAIL TERMINAL

(75) Inventor: Nathaniel C. Herwig, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 520 days.

(21) Appl. No.: 09/661,061

(22) Filed: Sep. 13, 2000

(51) Int. Cl.[7] .............................................. G05B 11/01
(52) U.S. Cl. ............................ 700/19; 235/2; 705/16; 705/21
(58) Field of Search ........................... 710/63; 705/16, 705/21; 235/2, 7; 700/1, 2, 19, 20

(56) References Cited

U.S. PATENT DOCUMENTS

| | | | |
|---|---|---|---|
| 5,301,346 A | 4/1994 | Notarianni et al. | 700/267 |
| 5,359,540 A | 10/1994 | Ortiz | 700/295 |
| 5,664,204 A | 9/1997 | Wang | 713/300 |
| 5,671,355 A | 9/1997 | Collins | 709/250 |
| 5,756,984 A * | 5/1998 | Kobayashi | 235/462.45 |
| 5,878,211 A * | 3/1999 | Delagrange et al. | 713/200 |
| 5,933,656 A | 8/1999 | Hansen | 710/62 |
| 5,935,224 A | 8/1999 | Svancarek et al. | 710/63 |
| 5,991,546 A | 11/1999 | Chan et al. | 710/62 |
| 6,003,138 A | 12/1999 | Chung | 713/300 |
| 6,006,295 A | 12/1999 | Jones et al. | 710/62 |
| 6,009,480 A | 12/1999 | Pleso | 710/38 |
| 6,053,410 A * | 4/2000 | Wike et al. | 235/462.43 |
| 6,105,143 A * | 8/2000 | Kim | 713/324 |
| 6,182,497 B1 * | 2/2001 | Krajci | 73/23.2 |
| 6,512,817 B1 * | 1/2003 | Dale et al. | 379/9.05 |
| 2001/0044747 A1 * | 11/2001 | Ramachandran et al. | 705/16 |
| 2001/0047441 A1 * | 11/2001 | Robertson | 710/65 |
| 2002/0026548 A1 * | 2/2002 | Frank | 710/100 |

* cited by examiner

Primary Examiner—Wilbert L. Starks, Jr.
Assistant Examiner—Ronald D Hartmgn, Jr.
(74) Attorney, Agent, or Firm—Maginot, Moore & Beck LLP; Paul W. Martin

(57) ABSTRACT

A wiring hub for a retail terminal system provides an interface between a main terminal of the retail terminal system and a plurality of peripherals associated with the retail terminal system, such as an input device, a scanner, a printer, and a customer display. The wiring hub provides a centralized chassis containing a plethora of connectors for power distribution to each peripheral and the main unit/terminal and for communication between each peripheral and the main terminal. Each peripheral includes a single cable having integrated power and communications wiring that attaches to appropriate connectors of the wiring hub. The wiring hub is coupled to a source of electricity and includes appropriate electricity routing and conversion for AC and DC peripherals/components. The main terminal is coupled to the wiring hub via one or two cables carrying power wiring, network wiring, and communication wiring. The wiring hub also provides a network connection for the main terminal. Additionally, the wiring hub includes a plurality of various protocol ports and a protocol converter and communications hub for allowing communications between the plurality of peripherals and the main terminal regardless of the communications protocol used by either one. The present invention improves installation and servicing of a retail terminal system. In addition, the present invention provides a consolidation of cabling.

1 Claim, 3 Drawing Sheets

WIRING HUB FOR A RETAIL TERMINAL

FIELD OF THE INVENTION

The present invention relates to retail terminal systems and, more particularly, to a wiring hub for retail terminal systems.

DESCRIPTION OF THE PRIOR ART

Electronic systems known as point-of-sale (POS) retail terminals are used extensively in retail businesses for consummating the purchase of goods and/or services by a consumer. Various types of POS retail terminals are in use such as check-out stations and kiosks, both self-service and clerk/operator assisted. These POS retail terminals are essentially functionally and structurally identical. In FIG. 1 there is shown a prior art POS retail terminal system generally designated 10. The prior art POS retail terminal system 10 as shown in FIG. 1 is exemplary of prior art POS retail terminal systems in general in order to explain the current state of retail terminal system configuration.

The retail terminal system 10 includes a main processing unit/terminal 12 that is coupled to a source of electricity via a power cord 44 and to a network, such as a local area network (LAN), wide area network (WAN), or the like (not shown), via a network cable 46. A display 13 may be optionally provided as well as an input device 17 (i.e. a keyboard). The retail terminal system 10 also typically includes a POS keyboard 14 to allow alphanumeric input to the main processing unit/terminal 12 via a keyboard communication cable 16. The keyboard communication cable 16 is coupled to and in communication with the main processing unit/terminal 12 via a suitable keyboard connector (not shown) associated with the main processing unit/terminal 12. A customer display 18 is also typically provided to allow the display of data/information to the customer during the particular transaction. Such data/information for the display 18 is received from the main processing unit/terminal 12 via a display communication/data cable 20. The display communication cable 20 is coupled to and in communication with the main processing unit/terminal 12 via a suitable display connector (not shown) associated with the main processing unit/terminal 12. The keyboard cable 16 and the display cable 20 each comprise a plurality (bundle) of separate wires surrounded by a fairly inflexible sheath.

The retail terminal system 10 may further include a scanner 26 to read bar codes such as universal product code (UPC) labels and other scan-readable coding from various products/merchandise being purchased, coupons, and the like. The scanner is coupled to and in communication with the main processing unit/terminal 12 via a scanner communication cable 28. The scanner communication cable 28 is connected to the main processing unit/terminal 12 via a scanner connector (not shown). The scanner 26 further includes a scanner power cord 30 adapted to be coupled to an electricity outlet (not shown) for supplying electricity to the scanner 26.

The retail terminal 10 still further may include a POS printer 32 that is operable to print receipts and or the like. The POS printer 32 is coupled to and in communication with the main processing unit/terminal 12 via a POS printer communication cable 34. The POS printer communication cable 34 is coupled to the main processing unit/terminal 12 via a POS printer connector (not shown). The POS printer 32 further includes a POS printer power cord 36 adapted to be coupled to an electricity outlet (not shown) for supplying electricity to the POS printer 32.

The retail terminal 10 even further may include a coupon printer 38 that is operable to print coupons and or the like. The coupon printer 38 is coupled to and in communication with the main processing unit/terminal 12 via a coupon printer communication cable 40. The coupon printer communication cable 40 is coupled to the main processing unit/terminal 12 via a coupon printer connector (not shown). The coupon printer 38 further includes a coupon printer power cord 42 adapted to be coupled to an electricity outlet (not shown) for supplying electricity to the coupon printer 38.

The various communication cables each comprise a plurality (bundle) of separate wires surrounded by a fairly inflexible sheath. The various power cords are standard power cords. It is evident from the foregoing that the prior art retail terminal system 10 includes a plethora of cords and cables that must be routed from the various peripherals to the main processing unit/terminal 12. As well, the main processing unit/terminal 12 includes various cables and/or cords.

A challenge facing users of retail terminal systems such as that shown in FIG. 1, is the tremendous amount of wiring that must be routed and attached between the main processing unit/terminal 12 and the various peripherals. In addition, it is necessary to separately route the power cords of each peripheral to an electricity outlet. Thus, in typical retail terminal systems there are a number of wires/cables to route, attach, and then try to conceal from the customer due to appearances and safety concerns. Retailers prefer to hide cabling both to improve the appearance of the premises, to prevent tampering or inadvertent damage, and/or safety concerns.

In current typical retail terminal systems, as shown in FIG. 1, virtually all of the cables terminate at the main processing unit/terminal where there are many I/O connectors, power jacks, and expansion slots. With the compact design of most modern checkout stands or retail furniture, it can be very difficult to route the many cables from their respective peripheral to the main processing unit/terminal as they must often pass through small mounts, hard to reach holes and crevices, and then be plugged into cramped connector panels—often in the most inaccessible area of the main processing unit/terminal.

Further complicating the wiring is the fact that many of the electronics of the terminal are now integrated with the main display unit. Instead of routing cables to an electronics box which is located on or in a counter top, all of these cables must be routed to a display, which is often elevated and/or in plain view of the customer.

It is thus desirable to minimize the amount of wiring between various peripherals and a main unit of a retail terminal system.

It is also desirable to consolidate the wiring between various peripherals and a main unit of a retail terminal system.

SUMMARY OF THE INVENTION

The present invention is a wiring hub for a retail terminal system that provides an interface between a main terminal of the retail terminal system and a plurality of associated peripherals such that the amount of wiring necessary between the main terminal and the plurality of peripherals is reduced. The wiring hub includes a plethora of power and communication ports for both the main terminal and the plurality of peripherals. A network connection is also provided for the main terminal.

The wiring hub is coupled to a source of electricity and includes circuitry to distribute the electricity in the same form as received and/or in a converted form suitable for use by the plurality of peripherals. Also included is circuitry for converting communication protocols of the plurality of peripherals to a communication protocol utilized by the main terminal. The main terminal is coupled to the wiring hub via one or two cables carrying power, peripheral communications and network data. Each peripheral includes a single cable supporting communication and power, if necessary. The present invention is thus a self-contained enclosure providing a plethora of functions, and is specifically provided for retail or self-service terminals.

In one form, the present invention is a retail terminal system having a main unit, a plurality of peripherals, and a wiring hub. The wiring hub includes a variety of features including a chassis carrying a plurality of AC electricity outlets and in communication with a source of AC electricity. A power supply, in communication with the source of AC electricity, is adapted to provide DC electricity. The DC electricity is supplied to a plurality of DC outlets carried by the chassis. A network port is provided that is in communication with an external network. A bus port and a plurality of communication ports in communication with the bus port is also provided. The main unit further includes a network interface coupled to and in communication with the network port, a bus interface coupled to and in communication with the bus port, and a power cord in communication with the source of AC electricity via the wiring hub. Each one of the plurality of peripherals has an integrated cable coupled to one of the plurality of AC electricity outlets and the plurality of DC electricity outlets to provide electricity from the particular AC or DC outlet to the respective peripheral, and coupled to one of the communication ports to provide communication between the main unit and the respective peripheral.

In another form, the present invention is a wiring hub for a retail terminal system having a main unit and a plurality of peripherals with the main unit adapted to be in communication with the plurality of peripherals. The wiring hub includes a variety of components including a chassis, a plurality of AC electricity outlets carried by the chassis and in communication with a source of AC electricity, a power supply in communication with the source of AC electricity and adapted to provide DC electricity, and a plurality of DC electricity outlets carried by the chassis and in communication with the power supply. The wiring hub further includes a network port in communication with an external network and adapted to be coupled to the main unit, a bus port adapted to be coupled to the main unit, a plurality of communication ports in communication with the bus port and adapted to be coupled respectively to the plurality of peripherals. A communication hub is interposed between at least some of the plurality of communication ports and the bus port.

In yet another form, the present invention is a method of coupling a plurality of peripherals to a main unit of a retail terminal system for communication therewith. The method includes various steps including coupling a communication line from each peripheral to a communication port of a wiring hub with each communication port configured to support a communication protocol of the respective peripheral. A communication bus is coupled from the main unit to a bus port of the wiring hub with the bus port configured to support a communication protocol of the communication bus. A communication protocol hub is provided in the wiring hub between the bus port and those communication ports that are configured for the same communication protocol as the bus port to permit communication between the bus port and the peripheral coupled to the communication port and utilizing the same communication protocol as the bus port. A further step is providing a protocol converter in the wiring hub between the bus port and those communication ports that are configured for a different communication protocol than the communication protocol of the bus port to permit communication between the bus port and the peripheral coupled to the communication port and utilizing the different communication protocol than the communication protocol of the bus port.

The present invention provides for the relocation of at least a majority of wiring from components and/or peripherals to a retail terminal to a more convenient position. This improves installation and servicing of a retail terminal system. In addition, the present invention provides a consolidation of cabling.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set forth herein illustrates a preferred embodiment of the invention, in one form, and such exemplification is not to be construed as limiting the scope of the invention in any manner.

DETAILED DESCRIPTION

Figure 1:
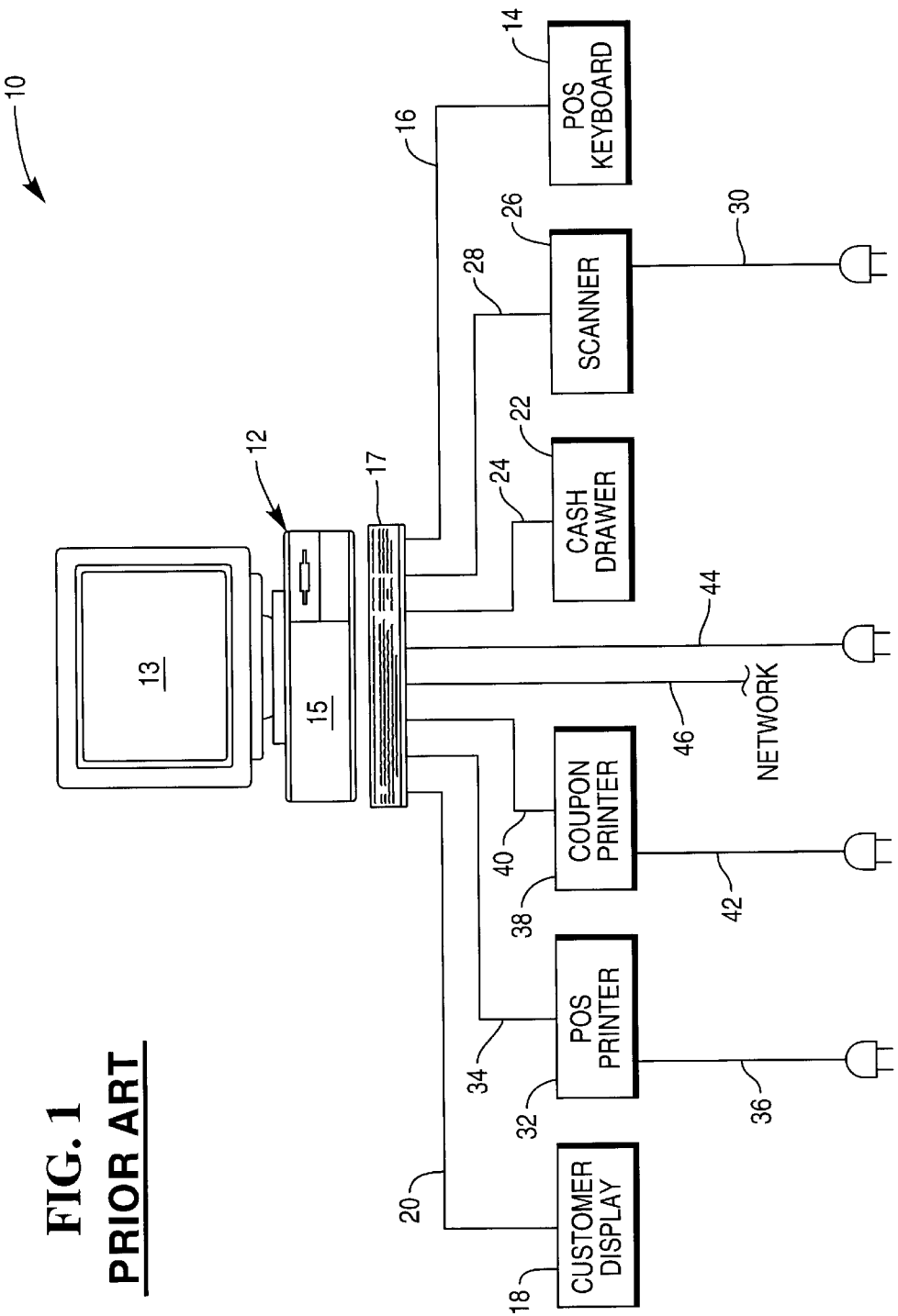
FIG. 1 is a diagrammatic representation of a prior art retail terminal system.
Figure 2:
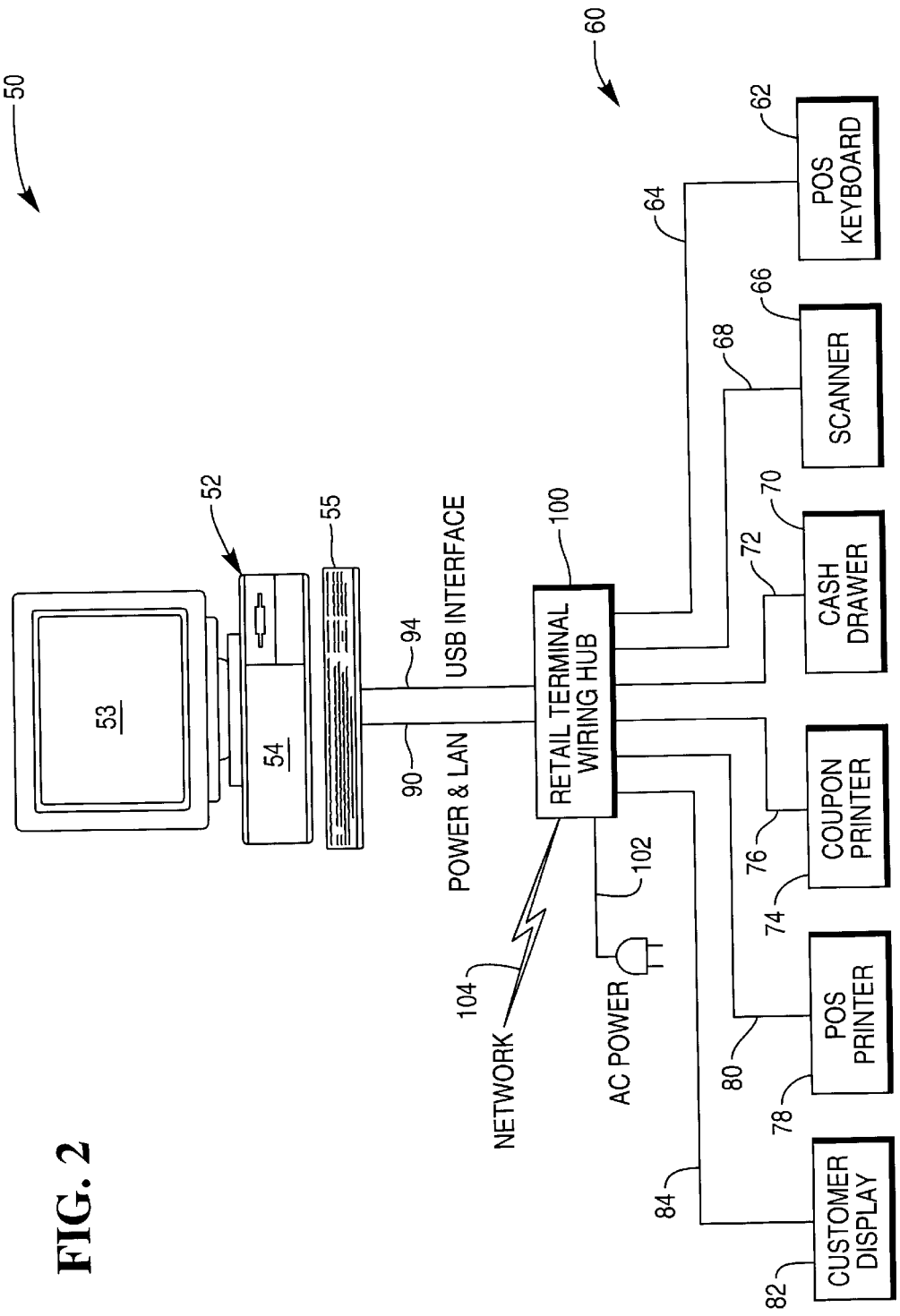
FIG. 2 is a diagrammatic representation of a retail terminal system having a wiring hub in accordance with the inventive principles set forth herein.

With reference to FIG. 2, there is depicted a representation of a retail terminal system, generally designated 50, in which the present invention is used. It should be initially appreciated that the retail terminal system 50 depicted in FIG. 2 and described herein is exemplary of any type and/or style of retail terminal system in which the present invention may be used. The retail terminal system 50 includes a main unit or terminal 52 and a plurality of peripherals generally designated 60.

The main unit 52 includes a processing unit 54 that has circuitry and/or logic, including memory and instructions, appropriate to operate the retail terminal system 50 and perform various retail terminal functions as are known in the art. The main unit 52 may or may not include a main unit display 53 of any type, as well as an input device 55 such as a keyboard (as shown), mouse, or the like. If the retail terminal is so equipped, the input device 55 and display 53 are coupled to and in communication with the main unit 52 as is known in the art, and may be used to perform diagnostics on the main unit 52, install and/or remove programs from the main unit 52, and/or perform other functions. It should be appreciated that the input device 55 and display 53 are optional for the main unit 52.

In accordance with an aspect of the present invention, the main unit 52 is coupled to and/or in communication with a retail terminal wiring hub 100 (hereinafter "wiring hub"). The wiring hub 100 is adapted/operable to provide power (i.e. electricity) to the main unit 52, provide a network connection to the main unit 52, and provide a data/communications bus to and from the main unit 52. Electricity supplied through the wiring hub 100 (obtained via a power cord 102 coupled to a source of electricity, not shown) is utilized in part by the main unit 52 in order to run itself and operate any components associated therewith. The network connection allows the main unit 52 to communicate and/or exchange data with other devices coupled to the network such as additional/other retail terminals and/or servers. The network may be a local area network (LAN), a wide area network (WAN), or any other network type and/or configuration. For networking capabilities, the main unit 52 includes a network interface (not shown), such as a network card. The data/communications bus provided by the wiring hub 100 and discussed further below, allows the main unit 52 to accept and communicate between the plurality of peripherals 60. For such communication/data exchange, the main unit 52 has a connector/port appropriate for the particular bus configuration/protocol utilized, as well as appropriate internal structure/circuitry for the bus. In one form, the bus structure/protocol may be a universal serial bus (USB) structure. In another form, the bus structure/protocol may be an IEEE-1394 (i.e. "Firewire") structure. It should be appreciated that other bus structures/protocols may be used. Hereinafter, however, the USB structure/protocol will be used as the bus structure/protocol.

In FIG. 2, the main unit 52 is coupled to and in communication with the wiring hub 100 for power and LAN capabilities via a power and LAN cable or line 90. The main unit 52 is also coupled to and in communication with the wiring hub 100 for data/communication exchange between the main unit 52 and the plurality of peripherals 60 via a bus interface line 94, here labeled a USB interface line. In order for such communication/data exchange to take place between the main unit 52 and the plurality of peripherals 60 through the wiring hub 100, the wiring hub 100 includes appropriate bus circuitry, protocol conversion circuitry/logic, and communication/data ports coupled thereto, as explained below. The wiring hub 100 is coupled to a source of electricity (i.e. AC power) via a power cord 102 and is coupled to a network via a network cable 104 and appropriate circuitry.

Each one of the plurality of peripherals 60 is in turn coupled to the wiring hub 100 such that the wiring hub 100 provides power to each connected peripheral. The wiring hub 100 also provides data/communications from the particular peripheral to the main unit 52 and vice versa. In accordance with an aspect of the present invention, each peripheral of the plurality of peripherals 60 associated with the retail terminal system 50 is in communication with the wiring hub via a single cable that integrates power and data/communication. In particular, a POS keyboard (data entry device) 62 includes a single power/data/communication integrated cable 64 that is appropriately connected to the keyboard 62 and is connected to the wiring hub 100 via a suitable connector. A scanner 66 includes a single power/data/communication integrated cable 68. The cable 68 includes a suitable connector and plug on one end to be coupled to the power port and the data/communication port of the scanner 66, and a suitable connector and plug on another end to be coupled to a power port and a data communication port of the wiring hub 100. A cash drawer 70 includes a single power/data/communication integrated cable 72. The cable 72 includes a suitable connector and plug on one end to be coupled to the power port and the data/communication port of the cash drawer 70, and a suitable connector and plug on another end to be coupled to a power port and a data communication port of the wiring hub 100. A coupon printer 74 includes a single power/data/communication integrated cable 76. The cable 76 includes a suitable connector and plug on one end to be coupled to the power port and the data/communication port of the coupon printer 74, and a suitable connector and plug on another end to be coupled to a power port and a data communication port of the wiring hub 100. A POS printer 78 includes a single power/data/communication integrated cable 80. The cable 68 includes a suitable connector and plug on one end to be coupled to the power port and the data/communication port of the POS printer 78, and a suitable connector and plug on another end to be coupled to a power port and a data communication port of the wiring hub 100. A customer display 82 includes a single power/data/communication integrated cable 84. The cable 84 includes a suitable connector and plug on one end to be coupled to the power port and the data/communication port of the display 82, and a suitable connector and plug on another end to be coupled to a power port and a data communication port of the wiring hub 100. It should be appreciated that peripherals other than those shown may be utilized and supported by the wiring hub 100 if needed by the retail terminal system. As well, some of the peripherals shown may not be included in a retail terminal system.

Each peripheral of the plurality of peripherals 60 thus includes a single, integrated wiring cord/cable that contains appropriate and sufficient wire to provide power (if necessary) to the peripheral as distributed by the wiring hub 100, and to provide data/communications through the wiring hub 100 to and from the retail terminal 52. The various cables 64, 68, 72, 76, 80, and 84 also terminate in appropriate connectors and/or plugs to interface with the various ports and/or outlets of the wiring hub 100. The wiring hub 100 is thus interposed and/or provides an interface between the main unit 52 and the plurality of peripherals 60.

Figure 3:
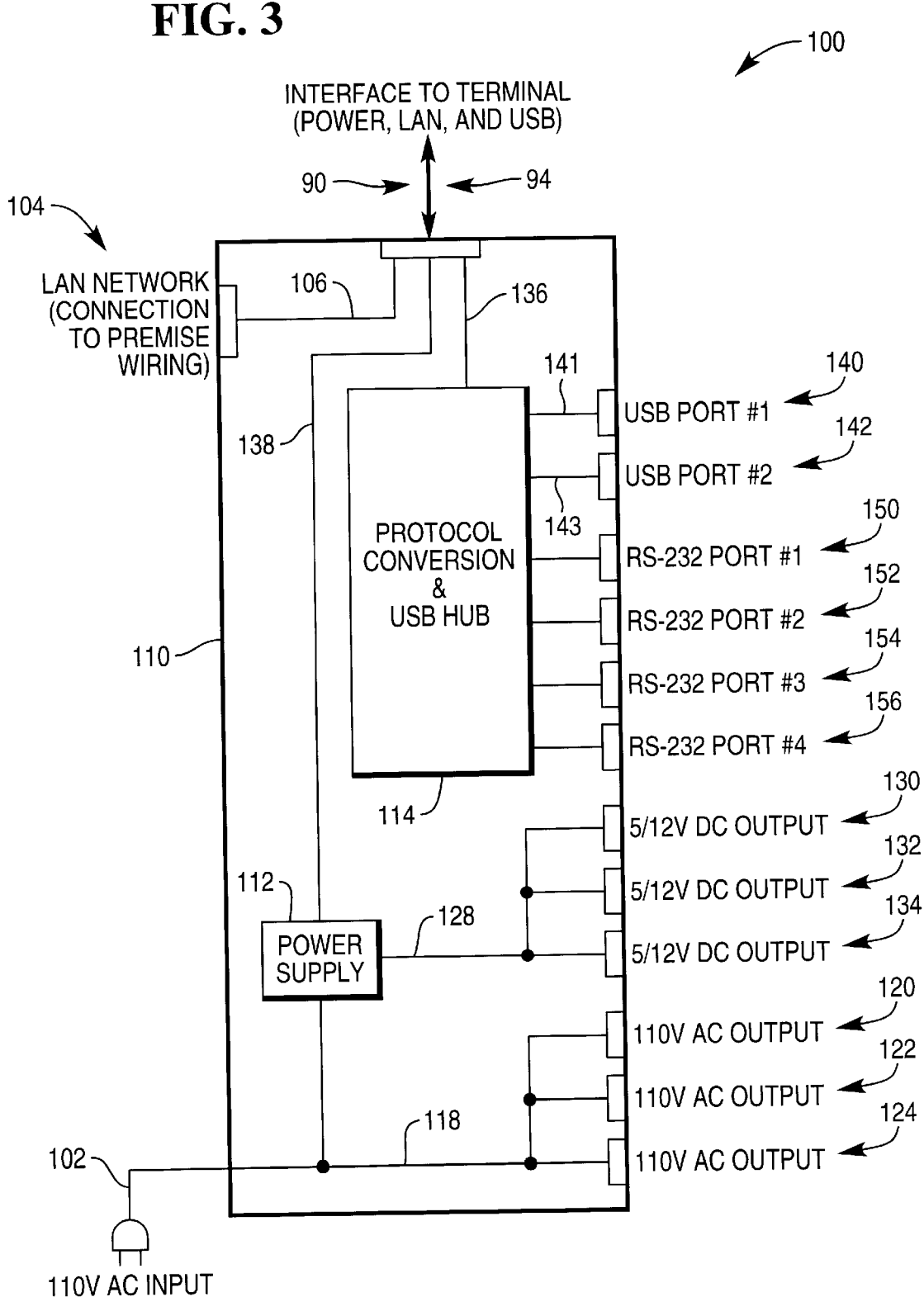
FIG. 3 is an enlarged schematic diagram of the wiring hub of FIG. 2.

With additional reference to FIG. 3 there is shown the wiring hub 100 in greater detail. The wiring hub 100 has a chassis, body, or housing 110 made of a material suitable for the present application. For those peripherals of the plurality of peripherals that require 110V AC, the wiring hub 100 includes 110V AC outputs/outlets, of which three such outlets 120, 122, and 124 are shown. The 110V outlets 120, 122, and 124 are in communication with the incoming 110V AC input via a line 118 coupled to the power cord 102. The 110V outlets 120, 122, and 124 are preferably standard type 110V AC outlets.

The chassis 110 also includes power supply circuitry 112 sufficient and appropriate to accept incoming 110V AC electricity via the power cord 102 and convert it to DC electricity. While the incoming 110 AC voltage may be converted into any DC voltage, the wiring hub 100 in FIG. 3 is shown having three 5/12 volt outlets 130, 132, and 134. Each 5/12V DC outlet 130, 132, and 134 is coupled to the power supply 112 via line 128. The 5/12V DC outlets 130, 132, and 134 are DC type outlets. It should be appreciated that other or additional DC voltage outputs may be provided depending on the needs of various peripherals of the plurality of peripherals 60. The cables associated with the various peripherals have the necessary plugs to mate with the AC or DC outlets.

The power supply 112 also provides electricity to the main unit/terminal 52 via line 138. The line 138 is integral with the cable 90 when external to the chassis 110. It should be appreciated that the two cables 90 and 94 shown in FIG. 2 may be integrated into a single cable as represented by the double arrow indicated as cables 90 and 94 in FIG. 3. As well, it should be appreciated that the cabling (power and data) from each of the plurality of peripherals 60 can either be a common cable or separate cables for data and power, regardless of what is shown in the figures. In the case of a common cable would have "split ends" or separate connectors terminating from the common cable end for attachment to different connection points.

The wiring hub 100 also includes appropriate and sufficient circuitry/logic for a protocol conversion and a USB hub interface 114 that is in communication with the main unit/terminal 52 via an internal bus line 136 and the USB bus cable 94. The main unit/terminal 52 is preferably equipped with USB ports and appropriate circuitry/logic to utilize the USB protocol as indicated above. The protocol conversion and USB hub interface 114 provides a USB hub to various USB ports, here USB port 140 (i.e. USB port #1) via bus line 141 and USB port 142 (i.e. USB port #2) via bus line 143. Of those peripherals of the plurality of peripherals 60 that utilize the USB protocol, their cable includes an appropriate USB connector to be coupled to one of the USB ports 140 or 142.

Of those peripherals of the plurality of peripherals 60 that communicate via another type of protocol, the protocol conversion and USB hub interface 114 includes appropriate and sufficient circuitry/logic to convert the USB protocol to another communications protocol and/or vice versa for two-way communication between the particular peripheral and the main unit 52. In FIG. 3, the wiring hub 100 is configured such that the other communications protocol is an RS-232 protocol and thus RS-232 ports 150 (i.e. RS-232 port #1), 152 (i.e. RS-232 port #2), 154 (i.e. RS-232 port #3), and 154 (i.e. RS-232 port #4) are provided in the chassis 110. It should be appreciated that other communications protocols may be provided, such as RS-485, Centronics/Parallel, or the like, either in addition to the RS-232 ports or in place thereof, such that any combination may be provided. Proprietary connections/protocols may also be provided by the wiring hub. Of course, the protocol conversion and USB hub 114 would have the appropriate circuitry/logic to perform the necessary conversion(s) for two-way communication between the particular peripheral and the main unit 52, as well as provide the necessary ports/connectors.

It should be appreciated that the number of 110V AC outlets, 5/12 V DC outlets, USB ports, and RS-232 ports shown in FIG. 3 is only exemplary. There may be more or less of each outlet and/or port. As well, the voltage and current type of the various electrical outlets may differ according to the requirements of the various peripherals. Additionally, the number and type of ports, and subsequently the protocol conversion and hub module 114, may differ according to the requirements of the various peripherals and/or of the main unit 52.

The wiring hub 100 also includes a network port 104 that is in communication with the cable 90 via an internal line 106, such that the network wiring (via cable 90) from the main unit 52 provides communication with the network wiring.

Operation

The wiring hub 100 is utilized for retail terminal systems in the following manner. The wiring hub 100 may be located in any place between the main unit/terminal 52 and the plurality of peripherals 60, such as underneath the counter of the main unit/terminal 52 or mounted thereto. A single power, LAN, and USB (network) cable/wires, or a power and LAN cable/wires, and a USB (network) cable/wire, from the wiring hub 100 is connected to the appropriate ports/connections of the main unit/terminal 52. These cables have relatively small and flexible wires and as such may be easily routed through a checkstand and/or mounts supporting the main unit/terminal 52. The peripherals are then located as necessary. The single cable from each peripheral is routed to the wiring hub 100. In this manner, virtually of the cabling/wiring is relocated to more convenient locations, out of sight of the consumer. This allows easier installation and servicing of the peripherals.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A retail terminal system comprising:

a retail terminal suitable for location at a checkout counter;

a plurality of retail peripherals that are suitable for location at the checkout counter; and a hub suitable for location at the checkout counter for consolidating power and data wires between the retail peripherals and the retail terminal, for consolidating power outlets for the retail peripherals and the retail terminal, and thereby improving the safety and appearance of the retail terminal system, wherein the hub includes a chassis;

a plurality of AC electricity outlets carried by said chassis and in communication with a source of AC electricity for providing power to the retail terminal and a first group of the retail peripherals;

a power supply in communication with the source of AC electricity for providing power to a power connector of said retail terminal and adapted to provide DC electricity;

a plurality of DC electricity outlets carried by said chassis and in communication with said power supply for providing power to a second group of the retail peripherals;

a universal serial bus (USB) hub within the chassis for converting non-USB serial data signals to USB signals, including a plurality of communication ports for connection to the retail peripherals; and a USB hub port for connection to a USB interface in said retail terminal;

a first network port in communication with an external retail network; and a second network port in communication with a network interface in the retail terminal;

wherein each one of said plurality of retail peripherals has a first integrated cable which is coupled between one of said plurality of AC electricity outlets or said plurality of DC electricity outlets and one of said communication ports; and wherein said hub has a second integrated cable coupled between the second network port and the network interface of said retail terminal, coupled between the USB hub port and the USB interface of said retail terminal, and coupled between said power supply and said power connector of said retail terminal.

* * * * *